(12) United States Patent
Lauer et al.

(10) Patent No.: US 8,260,694 B1
(45) Date of Patent: Sep. 4, 2012

(54) SYSTEM, METHOD, AND COMPUTER PROGRAM FOR MANAGING TRANSACTION BILLING ACROSS A PLURALITY OF BILLING SOURCES UTILIZING AN INTERFACE TO CONFIGURE ADVICE-OF-CHARGE

(75) Inventors: Joe Lauer, Seattle, WA (US); Chad Maglaque, Seattle, WA (US); Chun Hsu, Issaquah, WA (US); John Mascavage, Bellevue, WA (US)

(73) Assignee: OpenMarket, Inc., Seattle, WA (US)

( * ) Notice: Subject to any disclaimer, the term of this patent is extended or adjusted under 35 U.S.C. 154(b) by 587 days.

(21) Appl. No.: 12/349,383

(22) Filed: Jan. 6, 2009

Related U.S. Application Data

(60) Provisional application No. 61/038,187, filed on Mar. 20, 2008.

(51) Int. Cl.
*G07F 19/00* (2006.01)
*H04M 15/00* (2006.01)
*G06Q 30/00* (2006.01)

(52) U.S. Cl. ....... 705/34; 705/26.1; 705/26.41; 379/111
(58) Field of Classification Search ................ 705/34, 705/26.1, 26.41; 379/111
See application file for complete search history.

(56) References Cited

U.S. PATENT DOCUMENTS

| | | | | |
|---|---|---|---|---|
| 7,152,207 | B1 | 12/2006 | Underwood et al. | 715/526 |
| 7,463,878 | B2 * | 12/2008 | Kumar et al. | 455/406 |
| 2002/0019808 | A1 * | 2/2002 | Sharma | 705/40 |
| 2003/0191701 | A1 * | 10/2003 | Haseltine et al. | 705/34 |
| 2004/0210526 | A1 * | 10/2004 | Brown | 705/40 |
| 2008/0004949 | A1 | 1/2008 | Flake et al. | 705/14 |
| 2008/0287095 | A1 * | 11/2008 | Pousti | 455/406 |
| 2009/0132401 | A1 * | 5/2009 | Batz et al. | 705/34 |

OTHER PUBLICATIONS

Advice of Charge: Simplifying Wireless Data Pricing. Virgo Publishing. http://www.billingworld.com Posted on: Nov. 1, 2002.*

\* cited by examiner

*Primary Examiner* — Scott Zare
(74) *Attorney, Agent, or Firm* — Zilka-Kotab, PC

(57) ABSTRACT

A system, method, and computer program product are provided for managing transaction billing across a plurality of billing sources utilizing an interface. In use, information associated with a transaction is received. Additionally, billing of the transaction is managed utilizing an interface accessible to a plurality of billing sources. Further, a billing response is returned, based on the management of the billing of the transaction.

13 Claims, 10 Drawing Sheets

SYSTEM, METHOD, AND COMPUTER PROGRAM FOR MANAGING TRANSACTION BILLING ACROSS A PLURALITY OF BILLING SOURCES UTILIZING AN INTERFACE TO CONFIGURE ADVICE-OF-CHARGE

RELATED APPLICATION(S)

This application claims priority to a provisional application filed Mar. 20, 2008 under application Ser. No. 61/038,187, which is incorporated herein by reference in its entirety for all purposes.

FIELD OF THE INVENTION

The present invention relates to transactions associated with goods and/or services, and more particularly to providing billing for transactions associated with goods and/or services.

BACKGROUND

Traditionally, users initiating transactions associated with goods and/or services have been billed for such transactions. However, conventional techniques utilized for billing for transactions have generally exhibited various limitations. For example, oftentimes the billing of transactions is managed by a plurality of different billing sources, even when the goods and/or services associated with the transaction are provided by a single merchant. Unfortunately, conventional techniques utilized for billing for transactions have required use of multiple interfaces when different billing sources are involved.

There is thus a need for addressing these and/or other issues associated with the prior art.

SUMMARY

A system, method, and computer program product are provided for managing transaction billing across a plurality of billing sources utilizing an interface. In use, information associated with a transaction is received. Additionally, billing of the transaction is managed utilizing an interface accessible to a plurality of billing sources. Further, a billing response is returned, based on the management of the billing of the transaction.

DETAILED DESCRIPTION

Figure 1:
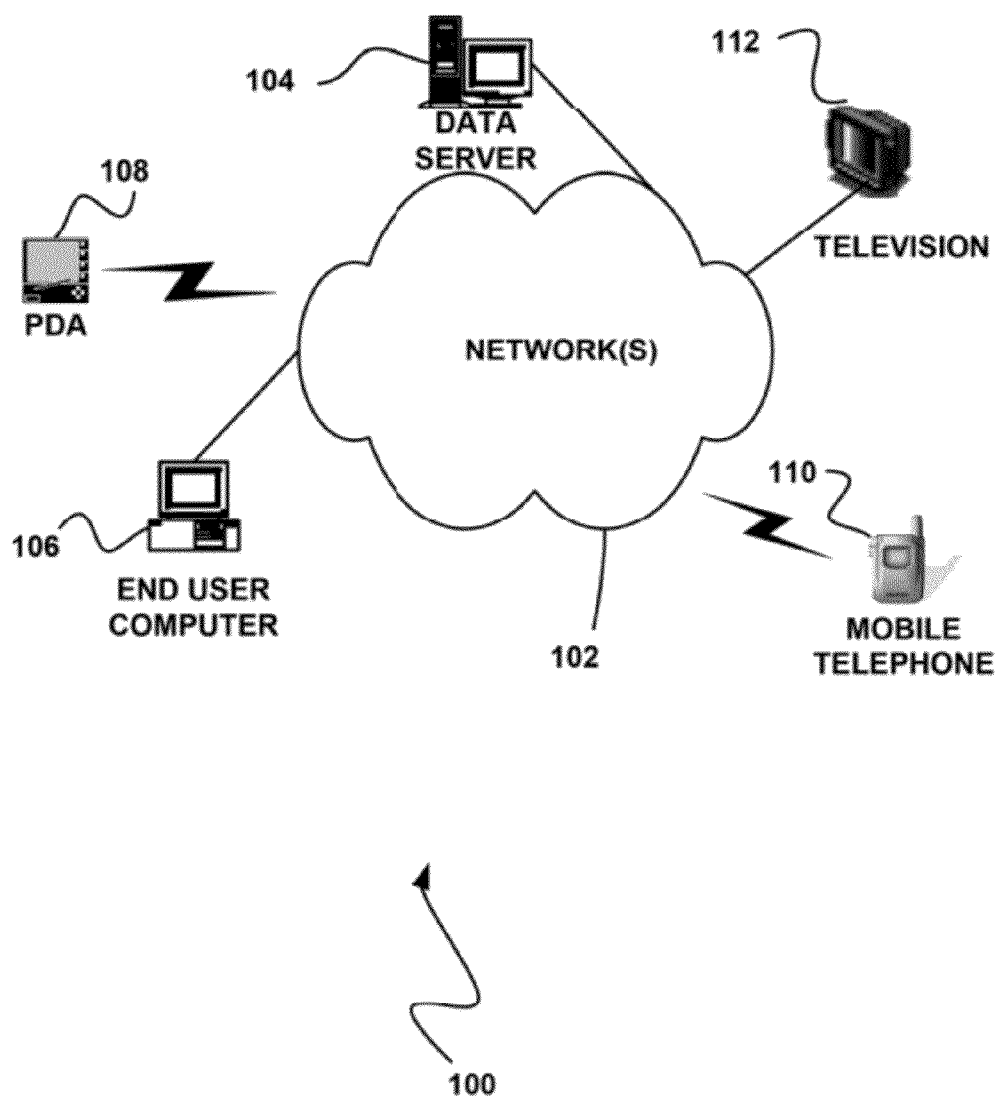
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
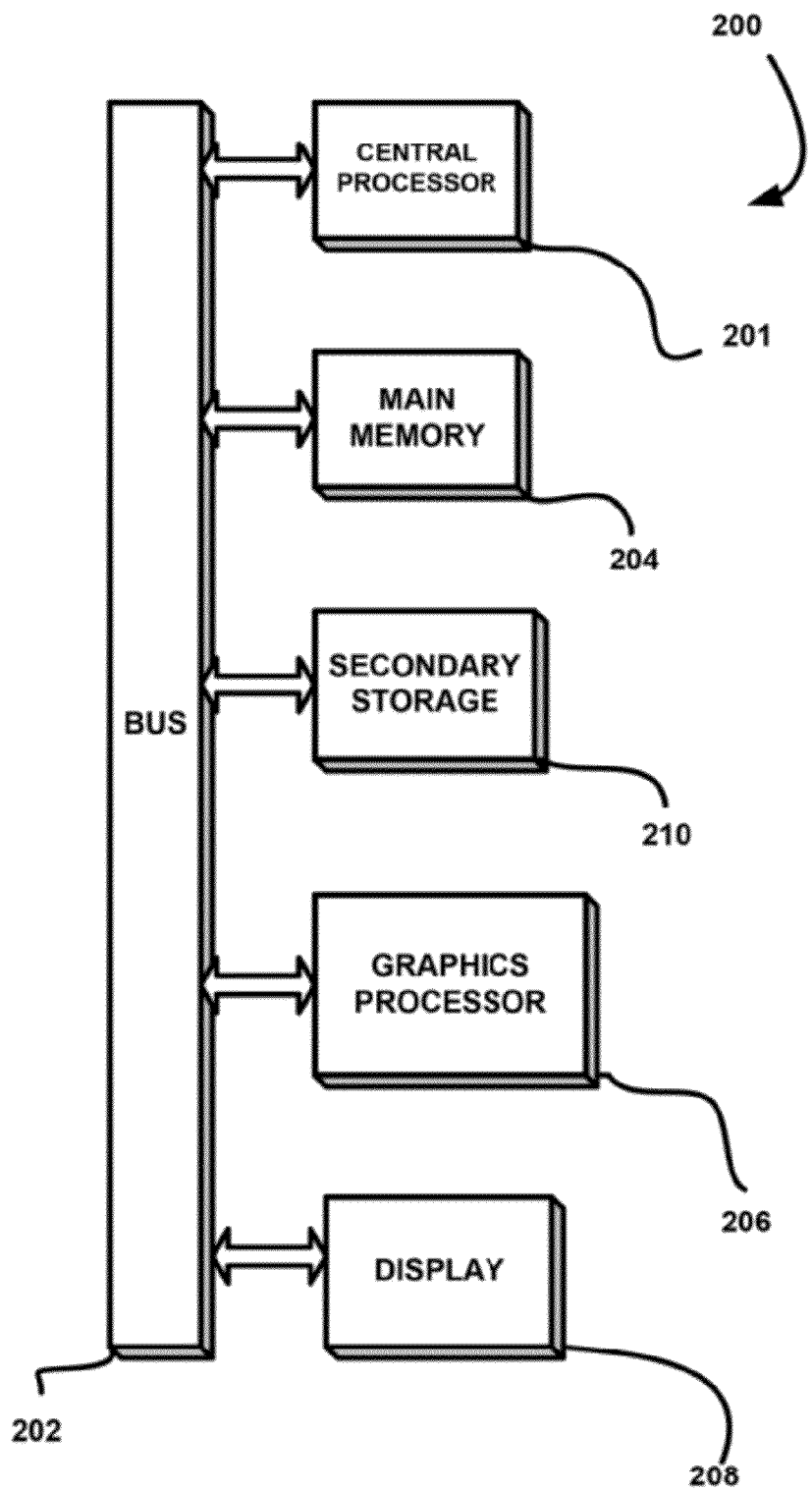
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
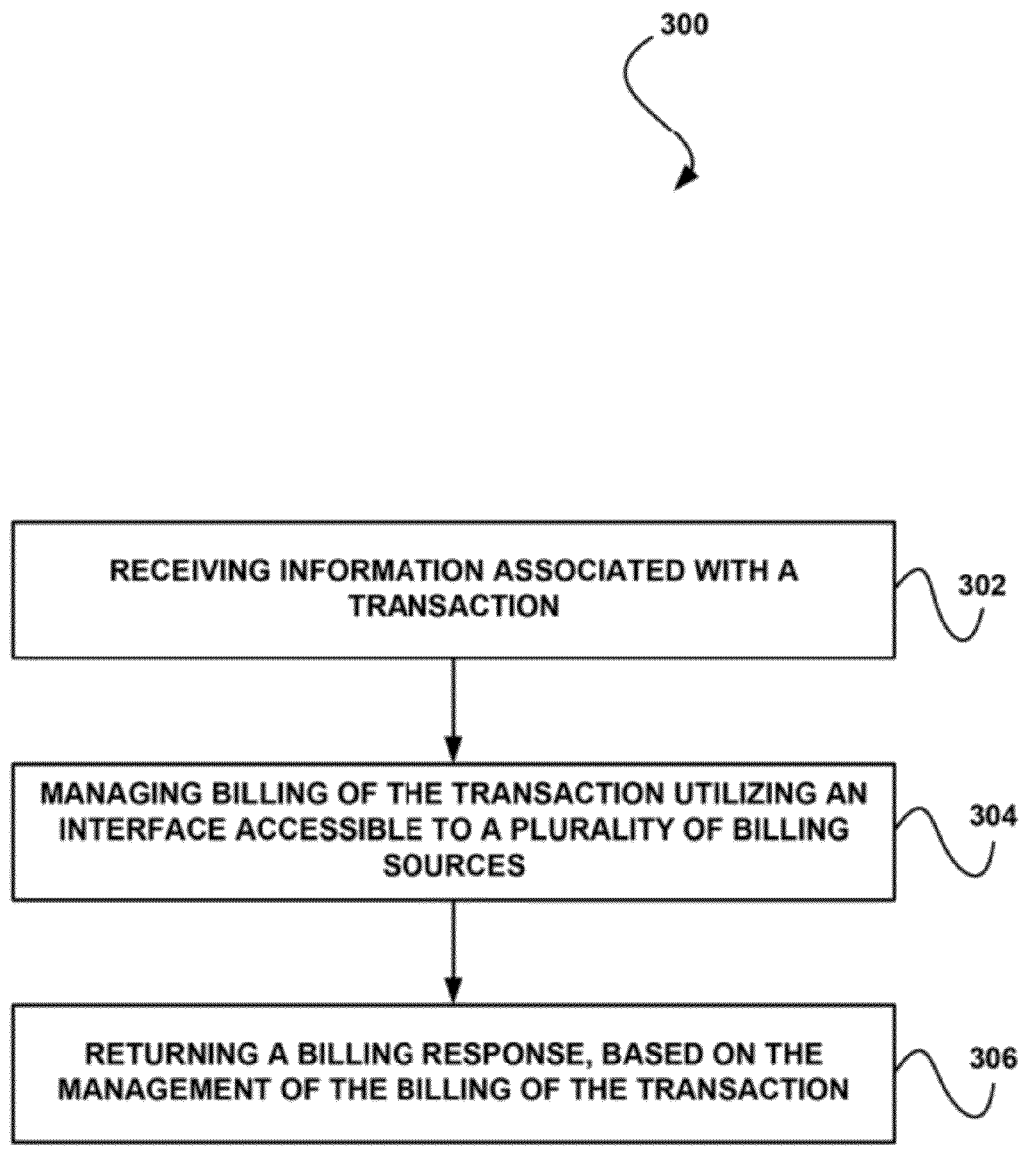
FIG. 3 shows a method for managing transaction billing across a plurality of billing sources utilizing an interface, in accordance with one embodiment.

FIG. 3 shows a method 300 for managing transaction billing across a plurality of billing sources utilizing an interface, in accordance with one embodiment. As an option, the method 300 may be carried out in the context of the details of FIGS. 1 and/or 2. Of course, however, the method 300 may be carried out in any desired environment.

As shown in operation 302, information associated with a transaction is received. In the context of the present description, the transaction may include any type of exchange for which billing may be managed. For example, the transaction may include a purchase of a good and/or a service, in one embodiment. As an option, such purchase may include a one-time purchase.

In other embodiments, the transaction may include an initiation of a subscription, renewal of a subscription, cancellation of a subscription, etc. The subscription may optionally be for a good and/or service. As another option, the subscription may be associated with recurring billing (e.g. monthly billing, yearly billing, etc.). Just by way of example, the subscription may be billed for on a periodic basis (e.g. provided in exchange for periodic payment responsive to a recurring bill).

Additionally, the information associated with the transaction may include any information that is descriptive of an aspect of the transaction. In one embodiment, the information associated with the transaction may include an indication of a type of the transaction. For example, the indication of the type of the transaction may include an indication of whether the transaction is a purchase of a good and/or service, an initiation of a subscription, a renewal of a subscription, a cancellation of a subscription, etc.

In another embodiment, information associated with the transaction may include an account number. Such account number may include a number identifying an account of a user that initiated the transaction. Just by way of example, the account number may include a bank account number, a debit account number, a credit account number, etc. Thus, the information associated with the transaction may include an identifier of a user. Optionally, the account number may be provided (e.g. by a user), an alias for the account number may be provided, the account number may be automatically deduced, etc.

In yet another embodiment, the information associated with the transaction may include a charge amount for the transaction. As an option, the charge amount may include a price for the transaction. As another option, the charge amount may include a payment amount required to be made in exchange for the transaction (e.g. prior to the transaction being completed, etc.).

Moreover, the information associated with the transaction may be received by an interface accessible to a plurality of billing sources that is utilized for managing billing of the transaction. Various embodiments of such interface will be described in more detail below with respect to operation 304. As yet a further option, the information associated with the transaction may be received from one of such billing sources. Examples of the billing sources will also be described in more detail below with respect to operation 304. In one embodiment, the information associated with the transaction may be received over a network (e.g. such as any of the networks described above with respect to FIG. 1).

Optionally, the information associated with the transaction may be received in response to initiation of the transaction. The transaction may be initiated by a user of any desired type of device capable of being utilized to initiate the transaction. Just by way of example, the transaction may be initiated via a web browser of a client device of the user. In various embodiments, the transaction may be initiated by an end-user, a merchant/content provider of the end-user, a carrier, a payment provider, or any other party that offers the good and/or service, and/or a party responsible for billing activity.

As another option, the information associated with the transaction may be received prior to completion of the transaction. For example, the information associated with the transaction may be received for completing the transaction (e.g. by billing for the transaction based on the information, etc.).

Furthermore, as shown in operation 304, billing of the transaction is managed utilizing an interface accessible to a plurality of billing sources. With respect to the present description, the interface may include any type of interface capable of being accessible to a plurality of billing sources for managing billing of transactions. For example, the interface may include an application (e.g. computer program, etc.) capable of managing the billing of various transactions associated with different billing sources.

Additionally, the billing sources may include any sources via which billing of the transaction may be provided. In one embodiment, the billing sources may include a merchant. For example, the merchant may provide the good and/or service associated with the transaction.

In another embodiment, the billing sources may include a payment provider. The payment provider may include any entity, service, etc. via which payment for the transaction may be provided. In various examples, the payment provider may include a bank, an issuer of a credit card, a cable provider, a telephone network operator, etc. In some embodiments, the payment provider may require that management of billing (e.g. associated with subscriptions) only be performed by such payment provider, instead of, for example, being performed by the merchant providing the good and/or service being billed.

In yet another embodiment, the billing sources may include a billing aggregator. As an option, the billing aggregator may include an application service provider (e.g. utilized for aggregating billing). Just by way of example, the application service provider may include OpenMarket®. In some embodiments, a merchant may opt to manage billing via a billing aggregator. To this end, the billing sources may include different types of billing sources (e.g. merchants, payment providers, billing aggregators, etc.).

It should be noted that the billing of the transaction may include any bill generated based on the transaction. For example, the billing of the transaction may include a bill for payment of the transaction. Still yet, managing the billing of the transaction may include submitting a bill for the transaction (e.g. submitting a request for payment of the transaction, a request for completion of the transaction, etc.). Such bill may be submitted to a payment provider, as an option.

As another option, managing the billing of the transaction utilizing the interface may include submitting the bill for the transaction via the interface. For example, the information associated with the transaction may be submitted to the interface. Further, the interface may generate the bill for the transaction and send such bill to the payment provider.

In another embodiment, managing the billing of the transaction may include the interface determining whether to submit the bill for the transaction (e.g. to the payment provider). As an option, the billing of the transaction may be managed based on one of the billing sources from which the information associated with the transaction is received. As another option, the billing of the transaction may be managed based on a type of the transaction.

Just by way of example, if the transaction includes initiating a subscription (such that payment for the subscription has not yet been provided) by a payment provider that does not manage billing for such subscription, the interface may submit a request for payment of the transaction. As another example, if the transaction includes cancelling a subscription by the payment provider that does not manage billing for such subscription, the interface may prevent a request for completion of the transaction from being sent to a payment provider, and may instead record the cancellation of the subscription. In various embodiments, the subscription may be cancelled by any party associated with billing activity (e.g. merchant, carrier, payment provider, etc.). Furthermore, cancelling the subscription may include cancelling an existing subscription (e.g. an already established subscription) or cancelling a pending subscription purchase request (e.g. a subscription purchase request that has been submitted but for which processing is incomplete).

Still yet, as shown in operation 306, a billing response is returned, based on the management of the billing of the transaction. In one embodiment, the billing response may be returned to the interface. In another embodiment, the billing response may be returned to the billing source from which the information associated with the transaction was received. Optionally, the billing response may be returned to such billing source via the interface.

In addition, the billing response may include any information associated with the management of the billing of the transaction. For example, the billing response may include an indication that the transaction was successful. Optionally, the billing response may indicate that the transaction was successful if payment for the transaction is made via the payment provider. As another option, the billing response may indicate that the transaction was successful if the transaction is completed.

As another example, the billing response may include an indication that the transaction failed (e.g. was unsuccessful). In one embodiment, the billing response may indicate that the transaction failed if payment for the transaction is not made (e.g. is incapable of being made, for example, due to insufficient funds, etc.) via the payment provider. In another embodiment, the billing response may indicate that the transaction failed if the transaction is not completed (e.g. due to an error, etc.). In yet another embodiment, the billing response may indicate that the transaction is pending (e.g. that a transaction request has been submitted, but a successful/cleared state has not yet occurred with respect to the carrier of the transaction).

More illustrative information will now be set forth regarding various optional architectures and uses in which the foregoing method may or may not be implemented, per the desires of the user (e.g. carrier, merchant, etc.). It should be strongly noted that the following information is set forth for illustrative purposes and should not be construed as limiting in any manner. Any of the following features may be optionally incorporated with or without the exclusion of other features described.

Figure 4:
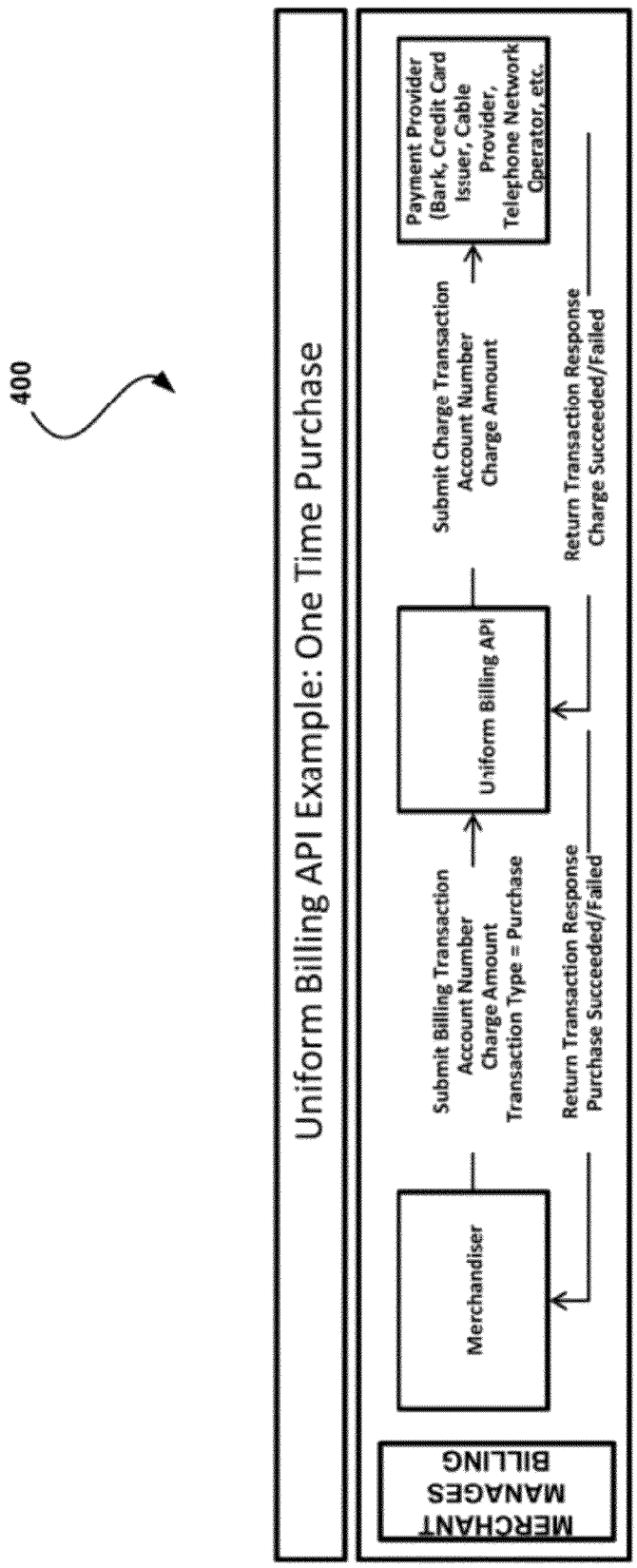
FIG. 4 shows a system for managing a one-time purchase utilizing an interface accessible to a plurality of billing sources, in accordance with another embodiment.

FIG. 4 shows a system 400 for managing a one-time purchase utilizing an interface accessible to a plurality of billing sources, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a merchandiser of the system 400 includes a merchant that manages billing of transactions. For example, the merchant may provide a good and/or service in exchange for payment. Thus, in response to initiation of a transaction by a purchaser (e.g. upon receipt of a request for a good and/or service from a purchaser), the merchant submits a billing transaction for receiving payment for the good and/or service. The billing transaction may include a bill for the good and/or service.

The billing transaction is submitted with information associated therewith. In one embodiment, the information submitted may include an account number of the purchaser (input by the purchaser upon initiation of the transaction, etc.). The account number may include a number of an account to be utilized for making payment for the transaction. In other embodiments, the information submitted may include an alias for the account number, information capable of being utilized to automatically deduce the account number, etc. Of course, however, the information may include any type of information capable of being associated with the billing transaction.

In another embodiment, the information submitted may include a charge amount. Thus, an amount of payment to be made via the account may be indicated. In yet another embodiment, the information submitted may include a charge type (e.g. single item, subscription, etc.). For example, an application program interface (API) may determine the charge type, such that the merchant may be assisted in managing both subscription purchases and single-item purchases as desired while abstracting the carrier back-end implementations. In a further embodiment, the information submitted may include a type of the transaction. With respect to the present embodiment, the type of the transaction may include a purchase.

As also shown, the system 400 includes an interface accessible to a plurality of billing sources that receives the billing transaction and the associated information submitted by the merchant. As shown, the interface may include a uniform billing application program interface (API), etc.

In response to receipt of the billing transaction and the associated information, the interface manages billing of the transaction for the merchant. As shown, the interface submits a charge transaction to a payment provider of the system 400. The charge transaction may instruct the payment provider to charge the account the charge amount for the transaction. Thus, information associated with the charge transaction indicating the charge amount and the account to be charged is submitted to the payment provider.

In response to receipt of the charge transaction and the associated information, the payment provider attempts to provide payment for the transaction initiated by the purchaser. For example, the payment provider may attempt to pay the charge amount from the account indicated in the information associated with the charge transaction.

Further, a charge response is sent from the payment provider to the interface. The charge response may include a response to the charge transaction submitted by the interface. In one embodiment, if the payment is made, the charge response may indicate that the charge transaction was successful. However, if the payment is unable to be made, the charge response may indicate that the charge transaction failed. Of course, as another option, the charge response may not be received, such that a state of the charge response may include a pending state.

Based on the charge response received from the payment provider, the interface sends a billing response to the merchant. The billing response may include a response to the billing transaction submitted by the merchant. For example, if the charge response indicates that the charge transaction was successful, the billing response may indicate that the billing transaction was successful (e.g. that the transaction initiated by the purchase was successfully billed for). If the charge response indicates that the charge transaction failed, the billing response may indicate that the billing transaction failed (e.g. that the transaction initiated by the purchase was not successfully billed for).

To this end, the merchant may complete the transaction (e.g. by providing the good and/or service requested via the transaction), based on the billing response. For example, if the billing response indicates that the billing transaction was successful, the merchant may complete the transaction. If, however, the billing response indicates that the billing transaction failed, the merchant may prevent the transaction from being completed.

Figure 5:
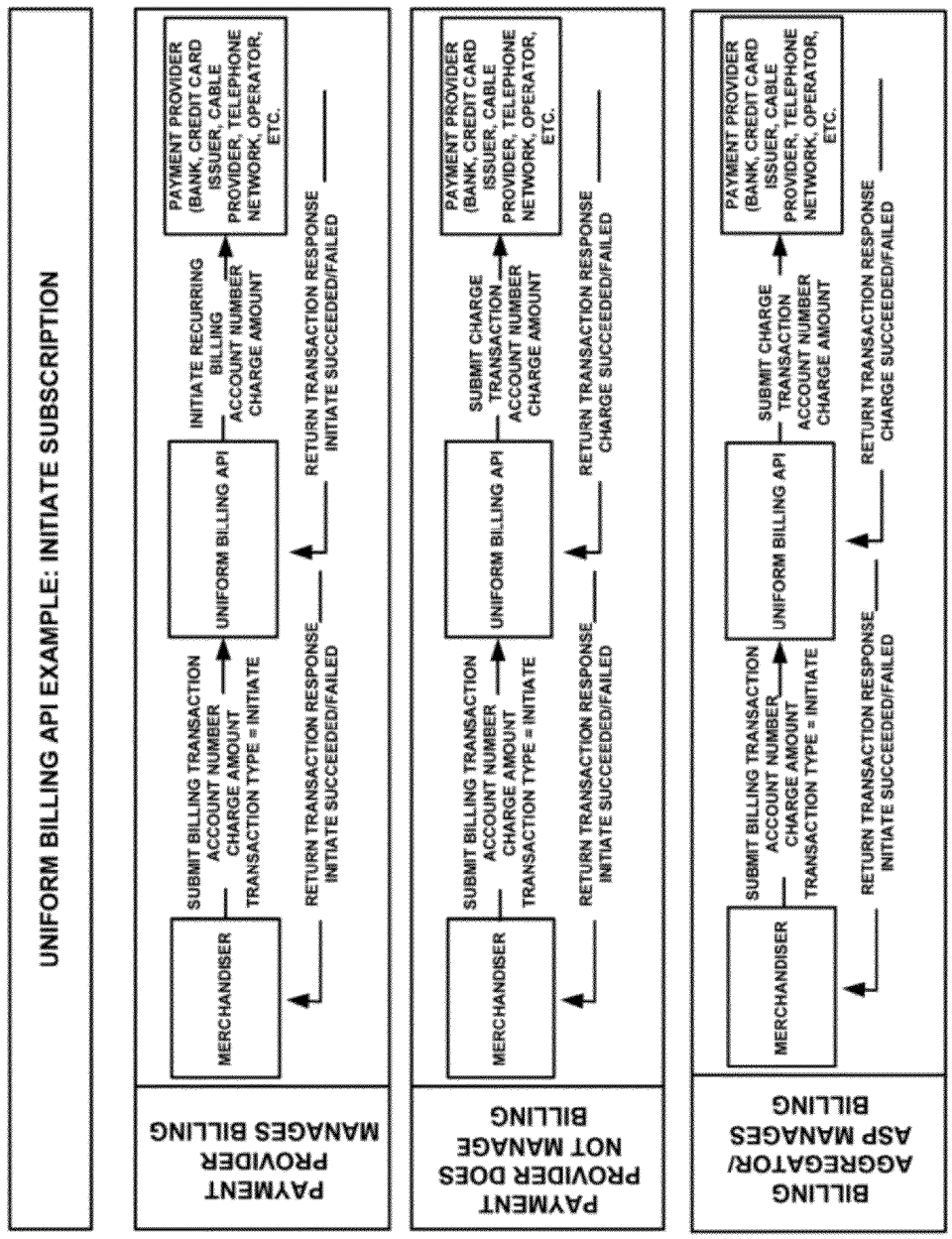
FIG. 5 shows a system for initiating a subscription utilizing an interface accessible to a plurality of billing sources, in accordance with yet another embodiment.

FIG. 5 shows a system 500 for initiating a subscription utilizing an interface accessible to a plurality of billing sources, in accordance with yet another embodiment. As an option, the system 500 may be implemented in the context of the architecture and environment of FIGS. 1-4. Of course, however, the system 500 may be implemented in any desired environment. Again, it should be noted that the aforementioned definitions may apply during the present description.

In one embodiment, a merchandiser of the system 500 includes a payment provider that manages billing of transactions for a merchant. For example, the merchant may provide a good and/or service in exchange for a subscription, with respect to the present embodiment. Thus, in response to initiation of a transaction by a purchaser for which a subscription does not already exist (e.g. upon receipt of a request for a good and/or service from a purchaser that does not already have a subscription for receiving the good and/or service, in response to a request for initiation of a subscription), the payment provider submits a billing transaction for receiving payment for the subscription. The billing transaction may include a bill for the subscription.

The billing transaction is submitted with information associated therewith. In one embodiment, the information submitted may include an account number of the purchaser (input by the purchaser upon initiation of the transaction, etc.). The account number may include a number of an account to be utilized for making payment for the subscription. In other embodiments, the information submitted may include an alias for the account number, information capable of being utilized to automatically deduce the account number, etc. Of course, however, the information may include any type of information capable of being associated with the billing transaction.

In another embodiment, the information submitted may include a charge amount. Thus, an amount of payment to be made for initiation of the subscription via the account may be indicated. In a further embodiment, the information submitted may include a type of the transaction. With respect to the present embodiment, the type of the transaction may include initiation of a subscription.

As also shown, an interface accessible to a plurality of billing sources receives the billing transaction and the associated information submitted by the payment provider. As shown, the interface may include a uniform billing application program interface (API), etc.

In response to receipt of the billing transaction and the associated information, the interface manages billing of the transaction for the payment provider. As shown, the interface submits an initiate recurring billing transaction to the payment provider. The initiate recurring billing transaction may instruct the payment provider to charge the account the recurring charge for the subscription. Thus, information associated with the initiate recurring billing transaction indicating the charge amount and the account to be charged is submitted to the payment provider.

In response to receipt of the initiate recurring billing transaction and the associated information, the payment provider attempts to provide payment for the transaction initiated by the purchaser, based on the recurring charge. For example, the payment provider may attempt to pay the charge amount from the account indicated in the information associated with the initiate recurring billing transaction, for initiating the subscription. In one embodiment, the information submitted may include a charge type (e.g. single item, subscription, etc.), such that it may be determined whether the charge type is associated with a single item, subscription, etc. In this way, the carrier back-end implementations may be abstracted while providing a consistent interface to the merchant that applies for any carrier (e.g. even when the carrier is unable to determine the charge type).

Further, an initiate recurring billing response is sent from the payment provider to the interface. The initiate recurring billing response may include a response to the initiate recurring billing transaction submitted by the interface. In one embodiment, if the payment is made, the initiate recurring billing response may indicate that the initiate recurring billing transaction was successful. However, if the payment is unable to be made, the initiate recurring billing response may indicate that the initiate recurring billing transaction failed.

Based on the initiate recurring billing response received from the payment provider, the interface sends a billing response to the payment provider. The billing response may include a response to the billing transaction submitted by the payment provider. For example, if the initiate recurring billing response indicates that the initiate recurring billing transaction was successful, the billing response may indicate that the billing transaction was successful (e.g. that the subscription was successfully initiated). If the initiate recurring billing response indicates that the initiate recurring billing transaction failed, the billing response may indicate that the billing transaction failed (e.g. that the subscription was not successfully initiated).

To this end, the merchant may complete the transaction (e.g. by providing the good and/or service requested via the transaction), based on the billing response. For example, if the billing response indicates that the billing transaction was successful, the merchant may complete the transaction. If, however, the billing response indicates that the billing transaction failed, the merchant may prevent the transaction from being completed.

In one other embodiment, the merchandiser of the system 500 may include the merchant managing billing for itself (e.g. such that the payment provider does not manage billing for the merchant). In yet another embodiment, the merchandiser of the system 500 may include a billing aggregator that manages billing for the merchant. The merchant and/or billing aggregator may also submit a billing transaction, in the manner described above with respect to the payment provider that manages billing for the merchant.

However, in response to receipt of the billing transaction by the interface, the interface submits a charge transaction to the payment provider. The charge transaction may instruct the payment provider to charge the account the recurring charge for the subscription, such that the subscription is initiated. Thus, information associated with the charge transaction indicating the charge amount and the account to be charged is submitted to the payment provider for initiating the subscription.

In response to receipt of the charge transaction and the associated information, the payment provider attempts to provide payment for the transaction initiated by the purchaser (e.g. payment for the initiation of the subscription), based on the recurring charge. For example, the payment provider may attempt to pay the charge amount from the account indicated in the information associated with the charge transaction.

Further, a charge response is sent from the payment provider to the interface. The charge response may include a response to the charge transaction submitted by the interface. In one embodiment, if the payment is made, the charge response may indicate that the charge transaction was successful. However, if the payment is unable to be made, the charge response may indicate that the charge transaction failed.

Based on the charge response received from the payment provider, the interface sends a billing response to the merchant and/or billing aggregator. The billing response may include a response to the billing transaction submitted by the merchant and/or billing aggregator. For example, if the charge response indicates that the charge transaction was successful, the billing response may indicate that the billing transaction was successful (e.g. that the subscription was successfully initiated). If the charge response indicates that the charge transaction failed, the billing response may indicate that the billing transaction failed (e.g. that the subscription was not successfully initiated).

To this end, the merchant may complete the transaction (e.g. by providing the good and/or service requested via the transaction, etc.), based on the billing response. For example, if the billing response indicates that the billing transaction was successful, the merchant may complete the transaction. If, however, the billing response indicates that the billing transaction failed, the merchant may prevent the transaction from being completed.

Figure 6:
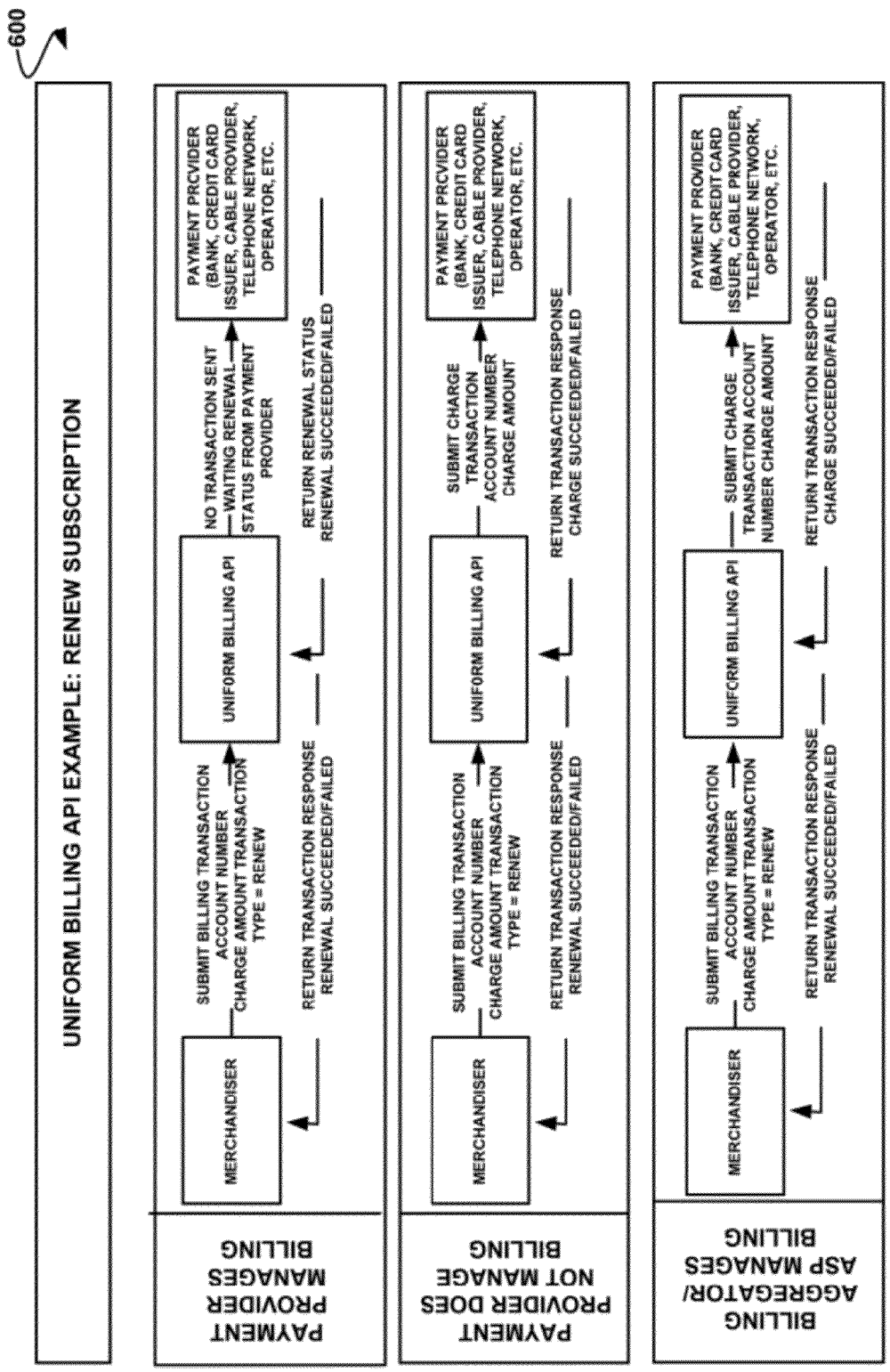
FIG. 6 shows a system for renewing a subscription utilizing an interface accessible to a plurality of billing sources, in accordance with still yet another embodiment.

FIG. 6 shows a system 600 for renewing a subscription utilizing an interface accessible to a plurality of billing sources, in accordance with still yet another embodiment. As an option, the system 600 may be implemented in the context of the architecture and environment of FIGS. 1-5. Of course, however, the system 600 may be implemented in any desired environment. Again, it should be noted that the aforementioned definitions may apply during the present description.

In one embodiment, a merchandiser of the system 600 includes a payment provider that manages billing of transactions for a merchant. For example, the merchant may provide a good and/or service in exchange for a subscription, with respect to the present embodiment. Thus, in response to initiation of a transaction by a purchaser for which a subscription already exists but is expired (e.g. upon receipt of a request for a good and/or service from a purchaser that already has a subscription for receiving the good and/or service that has expired, in response to a request from the purchaser to renew the subscription, etc.), the payment provider submits a billing transaction for receiving payment for renewal of the subscription. The billing transaction may include a bill for the renewal of the subscription.

The billing transaction is submitted with information associated therewith. In one embodiment, the information submitted may include an account number of the purchaser (input by the purchaser upon initiation of the transaction, etc.). The account number may include a number of an account to be utilized for making payment for the renewal of the subscription.

In another embodiment, the information submitted may include a charge amount. Thus, an amount of payment to be made via the account may be indicated. In yet another embodiment, the information submitted may include a charge type (e.g. renewal, etc.). In a further embodiment, the information submitted may include a type of the transaction. With respect to the present embodiment, the type of the transaction may include renewal of a subscription.

As also shown, an interface accessible to a plurality of billing sources receives the billing transaction and the associated information submitted by the payment provider. As shown, the interface may include a uniform billing application program interface (API), etc.

In response to receipt of the billing transaction and the associated information, the interface manages billing of the transaction (initiated by the purchaser) for the payment provider. As shown, the interface does not submit a charge transaction to the payment provider, but instead waits for a renewal status from the payment provider. For example, since the payment provider already manages billing for the merchant, the payment provider may already be informed of the bill for the renewal for the subscription.

If the payment provider returns a renewal status that the renewal was successful, the interface in turn returns a billing response to the payment provider managing billing for the merchant indicating that the subscription was renewed. If the payment provider returns a renewal status that the renewal failed, the interface in turn returns a billing response to the payment provider managing billing for the merchant indicating that the renewal of the subscription failed. If the renewal of the subscription fails, the merchant may prevent the transaction initiated by the purchaser from being completed. If, however, the subscription is renewed, the merchant may complete the transaction initiated by the purchaser. It should be noted that in other various embodiments, the transaction may be initiated by the merchant (e.g. without direct intervention by the user), such as if the user opts-in during an initial subscription purchase, for example.

As also shown, in other embodiments, a merchant managing its own billing for transactions (e.g. such that the payment provider does not manage billing for the merchant) and/or a billing aggregator of the system 600 that manages billing for the merchant may also submit a billing transaction, in the manner described above with respect to the payment provider that manages billing for the merchant.

In response to receipt of the billing transaction by the interface, the interface submits a charge transaction to the payment provider. The charge transaction may instruct the payment provider to charge the account the recurring charge for the subscription, such that the subscription is renewed. Thus, information associated with the charge transaction indicating the charge amount and the account to be charged is submitted to the payment provider for renewing the subscription.

In response to receipt of the charge transaction and the associated information, the payment provider attempts to provide payment for the transaction initiated by the purchaser. For example, the payment provider may attempt to pay the charge amount from the account indicated in the information associated with the charge transaction.

Further, a charge response is sent from the payment provider to the interface. The charge response may include a response to the charge transaction submitted by the interface. In one embodiment, if the payment is made, the charge response may indicate that the charge transaction was successful. However, if the payment is unable to be made, the charge response may indicate that the charge transaction failed.

Based on the charge response received from the payment provider, the interface sends a billing response to the merchant and/or billing aggregator. The billing response may include a response to the billing transaction submitted by the merchant and/or billing aggregator. For example, if the charge response indicates that the charge transaction was successful, the billing response may indicate that the billing transaction was successful (e.g. that the subscription was successfully renewed). If the charge response indicates that the charge transaction failed, the billing response may indicate that the billing transaction failed (e.g. that the subscription was not successfully renewed).

To this end, the merchant may complete the transaction (e.g. by providing the good and/or service requested via the transaction, etc.), based on the billing response. For example, if the billing response indicates that the billing transaction was successful, the merchant may complete the transaction. If, however, the billing response indicates that the billing transaction failed, the merchant may prevent the transaction from being completed.

Figure 7:
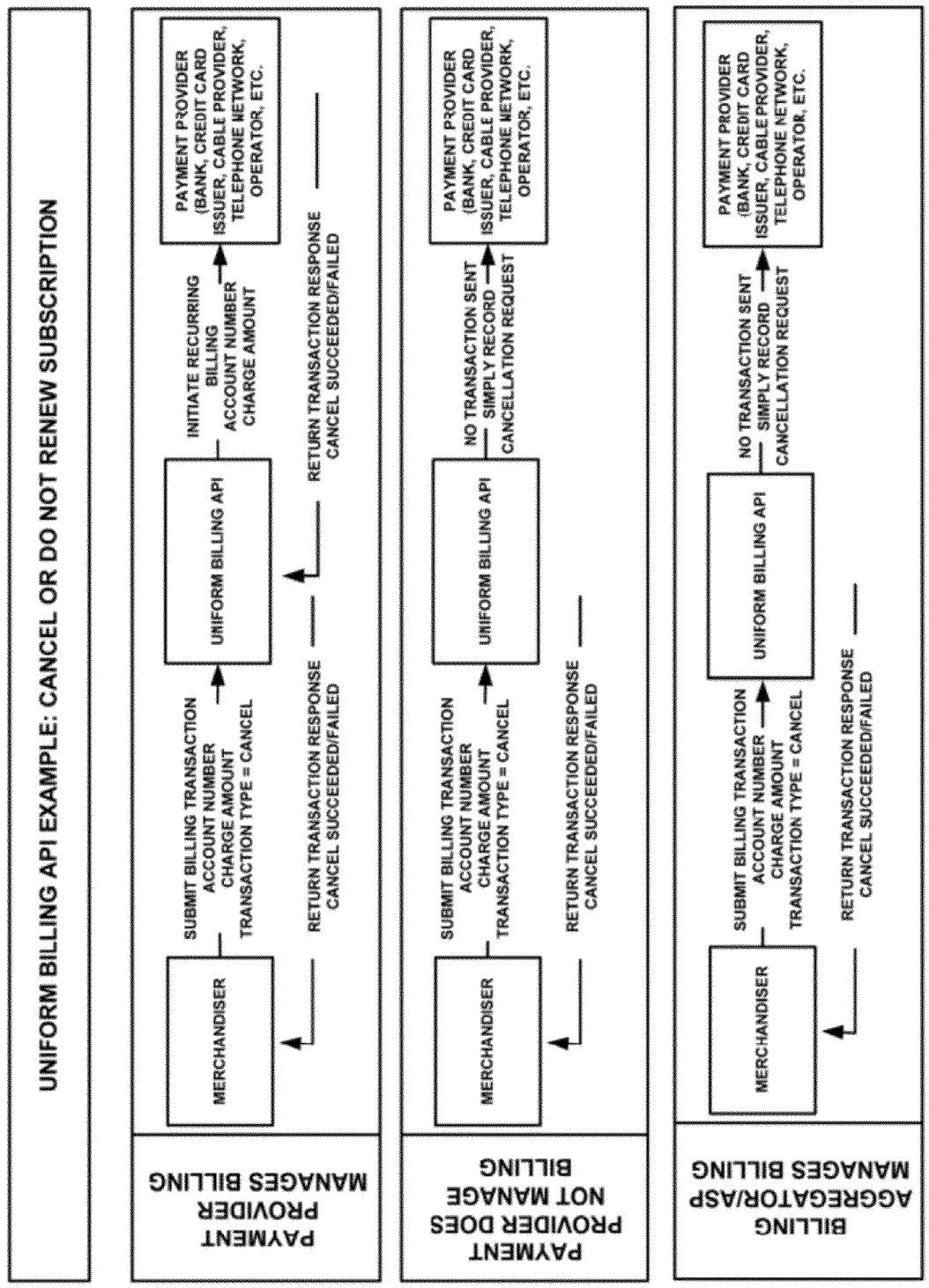
FIG. 7 shows a system for cancelling or preventing renewal of a subscription utilizing an interface accessible to a plurality of billing sources, in accordance with another embodiment.

FIG. 7 shows a system 700 for cancelling or preventing renewal of a subscription utilizing an interface accessible to a plurality of billing sources, in accordance with another embodiment. As an option, the system 700 may be implemented in the context of the architecture and environment of FIGS. 1-6. Of course, however, the system 700 may be implemented in any desired environment. Again, it should be noted that the aforementioned definitions may apply during the present description.

In one embodiment, a merchandiser of the system 500 includes a payment provider that manages billing of transactions for a merchant. For example, the merchant may provide a good and/or service in exchange for a subscription, with respect to the present embodiment. Thus, in response to initiation of a transaction by a purchaser for which a subscription already exists to cancel such subscription, the payment provider submits a billing transaction for cancelling the subscription.

The billing transaction is submitted with information associated therewith. In one embodiment, the information submitted may include an account number of the purchaser (input by the purchaser upon initiation of the transaction, etc.). The account number may include a number of an account to be utilized for cancelling the subscription.

In another embodiment, the information submitted may include a charge amount. Thus, an amount of payment to be made for cancelling the subscription via the account may be indicated. In yet another embodiment, the information submitted may include a charge type. In a further embodiment, the information submitted may include a type of the transaction. With respect to the present embodiment, the type of the transaction may include cancellation of a subscription.

As also shown, an interface accessible to a plurality of billing sources receives the billing transaction and the associated information submitted by the payment provider. As shown, the interface may include a uniform billing application program interface (API), etc.

In response to receipt of the billing transaction and the associated information, the interface manages billing of the transaction for the payment provider. As shown, the interface submits an initiate recurring billing cancellation transaction to the payment provider. The initiate recurring billing cancellation transaction may instruct the payment provider to cancel the recurring billing associated with the subscription, to thereby cancel the subscription (and optionally to make payment of any fee associated with the cancellation). Thus, information associated with the initiate recurring billing cancellation transaction indicating the optional charge amount and the account to be charged is submitted to the payment provider.

In response to receipt of the initiate recurring billing cancellation transaction and the associated information, the payment provider attempts to cancel the subscription by cancelling the recurring charge. Further, an initiate recurring billing cancellation response is sent from the payment provider to the interface. The initiate recurring billing cancellation response may include a response to the initiate recurring billing cancellation transaction submitted by the interface. In one embodiment, if the subscription is cancelled, the initiate recurring billing cancellation response may indicate that the initiate recurring billing cancellation transaction was successful. However, if the subscription is unable to be cancelled, the initiate recurring billing cancellation response may indicate that the initiate recurring billing cancellation transaction failed.

Based on the initiate recurring billing cancellation response received from the payment provider, the interface sends a billing response to the payment provider. The billing response may include a response to the billing transaction submitted by the payment provider managing billing for the merchant. For example, if the initiate recurring billing cancellation response indicates that the initiate recurring billing cancellation transaction was successful, the billing response may indicate that the billing transaction was successful (e.g. that the subscription was successfully cancelled). If the initiate recurring billing cancellation response indicates that the initiate recurring billing cancellation transaction failed, the billing response may indicate that the billing transaction failed (e.g. that the subscription was not successfully cancelled).

To this end, the merchant may prevent further transactions from the purchaser that requested the cancellation of the subscription, based on the billing response. For example, if the billing response indicates that the billing transaction was successful, the merchant may prevent further transactions by the purchaser (e.g. until the subscription is renewed or initiated, or until the user initiates a new purchase of a single item or a new subscription). If, however, the billing response indicates that the billing transaction failed, the merchant may allow further transactions by the purchaser.

In one other embodiment, the merchandiser of the system 700 may include the merchant managing billing for itself (e.g. such that the payment provider does not manage billing for the merchant). In yet another embodiment, the merchandiser of the system 500 may include a billing aggregator that manages billing for the merchant. The merchant and/or billing aggregator may also submit a billing transaction, in the manner described above with respect to the payment provider that manages billing for the merchant.

However, in response to receipt of the billing transaction by the interface, the interface does not send a transaction to the payment provider, and instead records the cancellation request. Thus, the subscription may be allowed to expire by the interface preventing further charge transactions for charging a recurring fee for the subscription to the payment provider. In this way, the subscription may be cancelled. In other optional embodiments, the carrier may initiate the cancellation of the subscription or the merchant may initiate the cancellation of the subscription, such that merchant initiated, user initiated and/or carrier initiated activities may be managed.

Further, the interface returns a billing response to the merchant and/or the billing aggregator. In one embodiment, the billing response may indicate that the billing transaction cancelling the subscription was successful. In another embodiment, the billing response may indicate that the billing transaction cancelling the subscription failed. For example, if the interface is unable to record the cancellation request (e.g. due to an error, etc.), the billing response may indicate that the billing transaction cancelling the subscription failed.

As noted above, the merchant may prevent further transactions from the purchaser that requested the cancellation of the subscription, based on the billing response. For example, if the billing response indicates that the billing transaction was successful, the merchant may prevent further transactions by the purchaser (e.g. until the subscription is renewed or initiated). If, however, the billing response indicates that the billing transaction failed, the merchant may allow further transactions by the purchaser.

Figure 8:
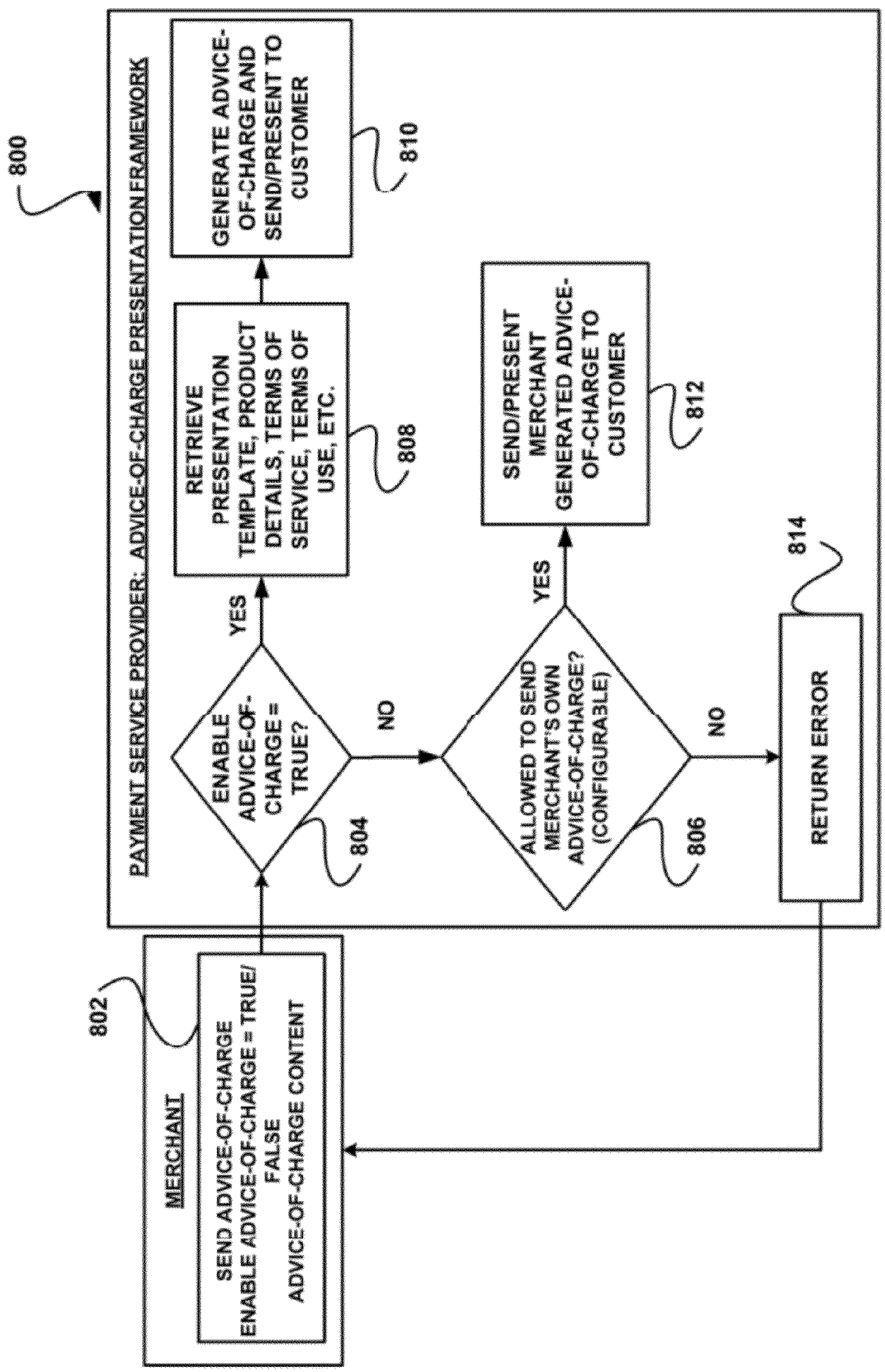
FIG. 8 shows a method for conditionally presenting an advice-of-charge submitted by a merchant utilizing a common framework, in accordance with yet another embodiment.

FIG. 8 shows a method 800 for conditionally presenting an advice-of-charge submitted by a merchant utilizing a common framework, in accordance with yet another embodiment. As an option, the method 800 may be carried out in the context of the architecture and environment of FIGS. 1-7. Of course, however, the method 800 may be carried out in any desired environment. Yet again, it should be noted that the aforementioned definitions may apply during the present description.

As shown in operation 802, a merchant sets a flag for enabling an advice-of-charge to true or false and sends such flag with advice-of-charge content to be provisioned to a payment service provider. It should be noted that the merchant may include any provider of a good and/or service. Further, the merchant may set the flag and provide the advice-of-charge content via an application, a graphical user interface, etc. Still yet, the merchant may send the flag and the advice-of-charge content to the payment service provider in any desired manner (e.g. via an electronic message, an interface, etc.). As another option, the flag may be stored as a configurable item. For example, the flag may be configured on behalf of the merchant, such that the merchant may optionally be prevented from sending the flag.

With respect to the present description, the advice-of-charge content may include any information associated with a transaction involving a good and/or service. For example, the advice-of-charge content may include a notification of a charge for providing a good and/or service. Optionally, such notification may be presented in response to a request to purchase a good and/or service, prior to providing the good and/or service based on the request therefor, etc.

In various embodiments, the advice-of-charge content may include terms of service, terms of use, web page content, graphics, a price, message dialog text, mobile text message, text templates containing standardized text, descriptions, short code, etc. for the good and/or service. As an option, the advice-of-charge content may be presented via a web page, a confirmation screen, a dialog box, a text message, etc. As an option, the advice-of-charge content may be configured based on whether the flag for enabling an advice-of-charge to true or false. For example, if the flag for enabling an advice-of-charge is set to true, the advice-of-charge content may only include limited information (e.g. limited based on a predetermined configuration, etc.), such as a message. As another example, if the flag for enabling an advice-of-charge is set to false, the advice-of-charge content may include an entire advice-of-charge capable of being presented (e.g. a web page, etc.). Further, the advice-of-charge content may be presented via any desired type of device capable of presenting such advice-of-charge content.

In one embodiment, the merchant may set the flag for enabling the advice-of-charge to true for indicating that a payment service provider (e.g. a service provider utilized for accepting payments for the good and/or service provided by the merchant) is to automatically generate an advice-of-charge to be presented when a transaction associated with the merchant is initiated. In another embodiment, the merchant may set the flag for enabling the advice-of-charge to false (or optionally may leave the flag set to null) for indicating that the payment service provider is to present the advice-of-charge content provided by the merchant when a transaction associated with the merchant is initiated. Further, the flag may be set at runtime.

Additionally, as shown in decision 804, the payment service provider determines whether the flag for enabling the advice-of-charge is set to true. With respect to the present embodiment, the payment service provider may make such determination upon identifying initiation of a transaction for a good and/or service by a purchaser of the good and/or service. Of course, as another option, the payment service provider may make such determination upon receipt of the flag and advice-of-charge content.

If the payment service provider determines that the flag for enabling the advice-of-charge is set to true, the payment service provider retrieves information for generating the advice-of-charge. Note operation 808. Thus, the advice-of-charge may be generated based on information associated with the payment service provider. As shown, the information may include a presentation template, product details associated with the good and/or service based on which the advice-of-charge is to be presented, default advice-of-charge content (e.g. terms of use, terms of service, etc.), etc. Note operation 808. In one embodiment, such information may be retrieved from a database stored locally with respect to the payment service provider.

Additionally, as shown in operation 810, the payment service provider generates the advice-of-charge using the information and presents the advice-of-charge to the purchaser. For example, the payment service provider may generate the advice-of-charge by inputting the product details, default advice-of-charge content, etc. into the presentation template. As an option, the advice-of-charge may also be generated by including a custom message provided by the merchant.

Table 1 illustrates one example of a flag for enabling an advice-of-charge that is set to true and advice-of-charge content capable of being provisioned to a payment service provider. It should be noted that such flag and advice-of-charge content are set forth for illustrative purposes only, and thus should not be construed as limiting in any manner.

TABLE 1

EnableAdviceOfCharge = True
Advice-Of-Charge Content: Screen text = "Please confirm your Traffic Alert subscription."

Figure 9:
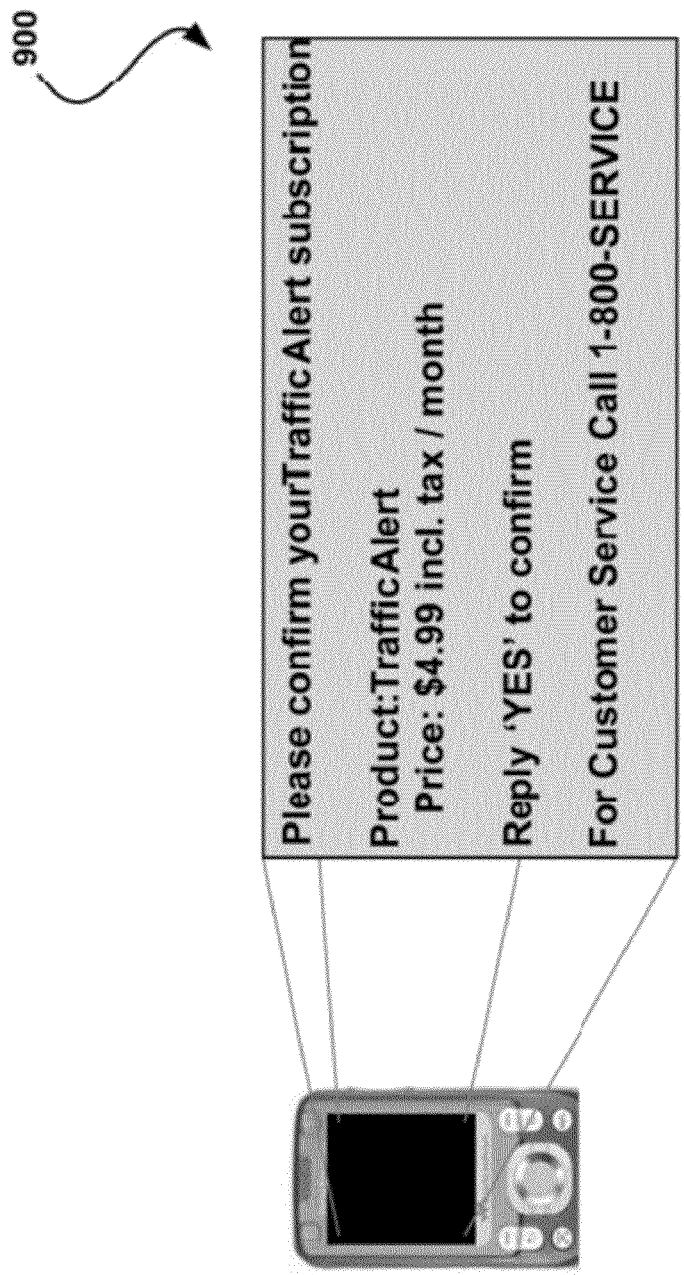
FIG. 9 shows a graphical user interface displaying an advice-of-charge when an automatic advice-of-charge is enabled, in accordance with still yet another embodiment.

Since the flag for enabling an advice-of-charge is set to true, the payment service provider may automatically generate an advice-of-charge based on information associated with the payment service provider (e.g. a presentation template provided by the payment service provider, etc.). FIG. 9 shows an example of a graphical user interface (GUI) 900 displaying an advice-of-charge when an automatic advice-of-charge is enabled (i.e. the advice-of-charge automatically generated by the payment service provider based on the flag for enabling an advice-of-charge that is set to true and advice-of-charge content provisioned by the merchant to the payment service provider). As shown, the advice-of-charge may include additional information not provisioned to the payment service provider by the merchant, such as product information, a price, contact information, etc.

However, if in decision 804 the payment service provider determines that the flag for enabling the advice-of-charge is not set to true (e.g. is set to false or optionally null), the payment service provider determines whether the merchant is allowed to have the advice-of-charge configured by the merchant (as indicated in the advice-of-charge content) sent. Note decision 806. The determination may be based on any desired criteria (e.g. configurable criteria). For example, the determination may be based on the merchant, the product and/or service for which the advice-of-charge content is to be presented, etc.

If it is determined that the merchant is allowed to have the advice-of-charge configured by the merchant sent, the advice-of-charge generated by the merchant as indicated in the advice-of-charge content is presented to the purchaser. Note operation 812. Thus, the payment service provider may present an advice-of-charge configured by the merchant.

Table 2 shows one example of a flag for enabling an advice-of-charge that is set to false and advice-of-charge content capable of being provisioned to a payment service provider. It should be noted that such flag and advice-of-charge content are set forth for illustrative purposes only, and thus should not be construed as limiting in any manner.

TABLE 2

EnableAdviceOfCharge = False
Advice-Of-Charge Content: Screen text = "Would you like to purchase Traffic Alert? Reply 'Y' to continue."

Figure 10:
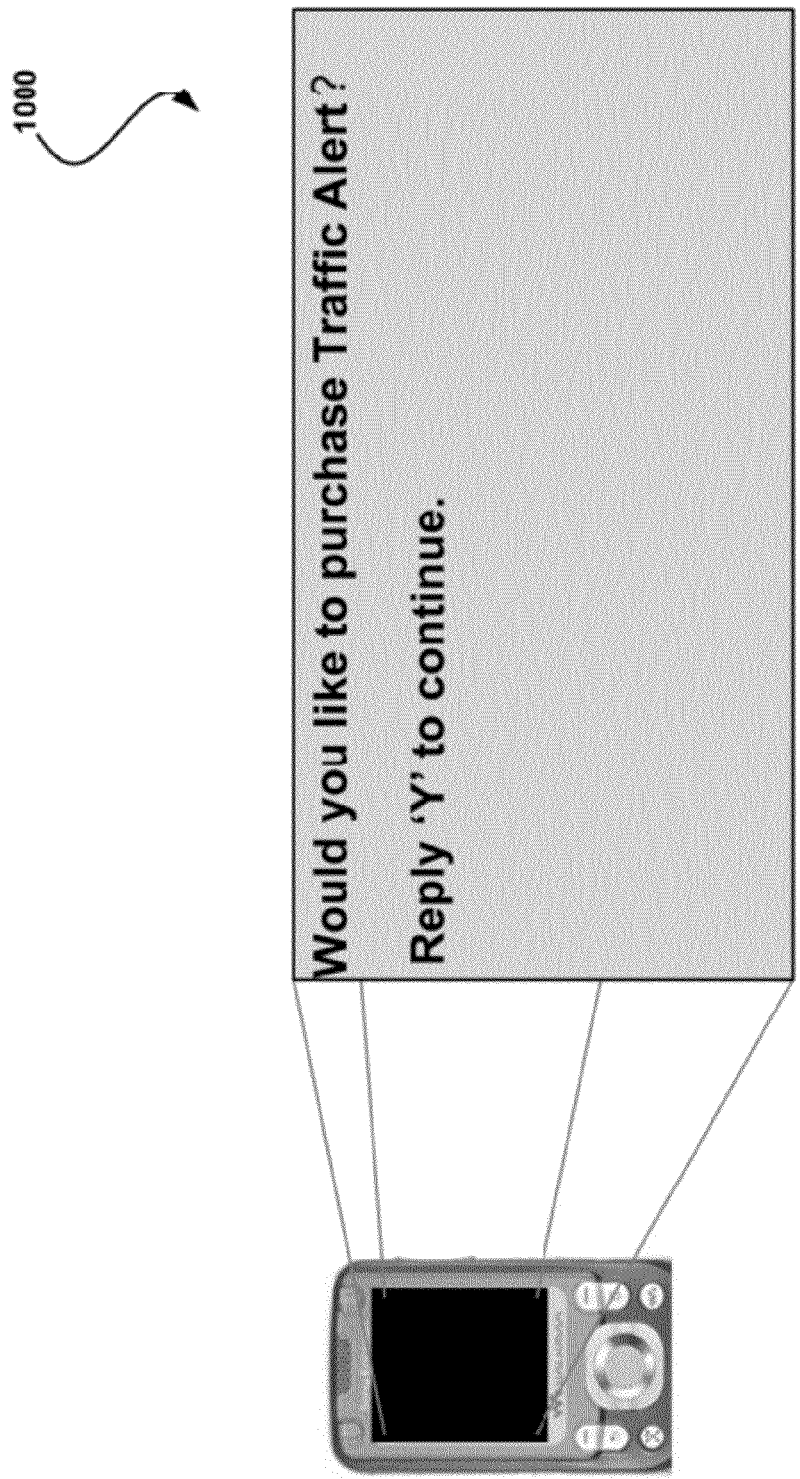
FIG. 10 shows a graphical user interface displaying an advice-of-charge when an automatic advice-of-charge is disabled, in accordance with another embodiment.

Since the flag for enabling an advice-of-charge is set to false, the payment service provider, upon a determination that the merchant is allowed to have the advice-of-charge configured by the merchant sent, may present an advice-of-charge solely based on the advice-of-charge content provided by the merchant. FIG. 10 shows an example of a GUI 1000 displaying an advice-of-charge configured by a merchant when an automatic advice-of-charge is disabled (i.e. the advice-of-charge designated by the merchant being presented based on the flag for enabling an advice-of-charge that is set to false and advice-of-charge content provisioned by the merchant to the payment service provider). As shown, the advice-of-charge may be limited to the advice-of-charge content provided by the merchant.

Moreover, if in decision 806 it is determined that that the merchant is not allowed to have the advice-of-charge configured by the merchant sent, an error is returned to the merchant. Note operation 814. The error may include any desired information. For example, the error may indicate that the flag enabling the advice-of-charge is expected by the payment service provider to be set to true, thus indicating that the merchant may be sending to the payment service provider an incorrect type of advice-of-charge content.

In one embodiment, the payment service provider may employ a uniform advice-of-charge framework for receiving the flag enabling the advice-of-charge set by the merchant and for performing operations 804-814. Such uniform advice-of-charge framework may therefore be utilized by a first party (e.g. the merchant) to configure an advice-of-charge, and may enable presentation of such advice-of-charge by a second party (e.g. the payment service provider).

To this end, the merchant may be prevented from inadvertently sending to the purchaser an advice-of-charge generated by the merchant when the service provider is configured to generate and send the advice-of charge. Just by way of example, if the merchant sets the flag to false along with advice-of-charge content that includes an entire advice-of-charge, but the merchant has been configured to have the advice-of-charge generated by the payment service provider, the merchant may be prevented from having the advice-of-charge configured by the merchant (via the advice-of-charge content) sent.

In addition, the uniform advice-of-charge interface may optionally allow the merchandisers (e.g. payment providers, merchants, etc.) to coordinate advice-of-charge presentations across multiple service providers (e.g. payment service providers), some of which may allow the merchandisers to present advice-of-charges generated by such merchandisers and some of which may not allow the merchandisers to present advice-of-charges generated by such merchandisers.

As another option, the uniform advice-of-charge interface may prevent duplication of advice-of-charges by only allowing either an advice-of-charge generated by a merchandiser or an advice-of-charge generated by the service provider. Still yet, the merchandisers may utilize the uniform advice-of-charge interface to enable advice-of-charges to be presented by an application service provider, as desired.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a tangible computer readable medium, comprising:
    computer code for receiving, utilizing a uniform billing application program interface, information associated with a transaction, the information associated with the transaction including an indication of a type of the transaction, an account number, an identifier of a user, and a charge amount for the transaction, the uniform billing application program interface capable of receiving the information from a plurality of different types of billing sources including a merchant, a payment provider, and a billing aggregator;
    computer code for determining whether the transaction is of a first type, utilizing the uniform billing application program interface;
    computer code for determining whether the transaction is of a second type, utilizing the uniform billing application program interface;
    computer code for determining whether the transaction is of a third type, utilizing the uniform billing application program interface;
    computer code for managing billing of the transaction utilizing the uniform billing application program interface which is accessible to the plurality of different types of billing sources, the managing including:
        if it is determined that the transaction is of the first type, submitting, utilizing the uniform billing application program interface, a first type of charging instructions for the transaction to a payment provider,
        if it is determined that the transaction is of the second type, submitting, utilizing the uniform billing application program interface, a second type of charging instructions for the transaction to the payment provider,
        if it is determined that the transaction is of the third type, submitting, utilizing the uniform billing application program interface, a third type of charging instructions for the transaction to the payment provider, and
        receiving, utilizing the uniform billing application program interface, a transaction response;
    computer code for returning a billing response to at least one of the billing sources from which the information associated with the transaction was received, based on the transaction response, the billing response including one of an indication that the transaction was successful, an indication that the transaction failed, and an indication that the transaction is pending;
    computer code for receiving a flag set by a merchant wherein the merchant may set the flag to true or false, wherein a false setting indicates that the payment service provider is to generate and send an advice-of-charge; and computer code for determining whether the flag is set to false;

wherein if it is determined that the flag is set to false, the merchant is prevented from sending an advice-of-charge generated by the merchant, and if it is determined that the flag is set to true, the merchant is not prevented from sending an advice-of-charge generated by the merchant.

2. The computer program product of claim 1, wherein the transaction includes a purchase of at least one of a good and a service.

3. The computer program product of claim 1, wherein the transaction includes an initiation of a subscription.

4. The computer program product of claim 3, wherein the initiation of the subscription is by the payment provider, and the payment provider does not manage billing for the subscription, such that the uniform billing application program interface submits a request for payment of the transaction.

5. The computer program product of claim 1, wherein the transaction includes a renewal of a subscription.

6. The computer program product of claim 1, wherein the transaction includes a cancellation of a subscription.

7. The computer program product of claim 1, further comprising computer code for configuring the advice-of-charge utilizing the uniform billing application program interface, by the one of the plurality of different types of billing sources, and enabling presentation of the advice-of-charge by the payment provider.

8. The computer program product of claim 1, wherein the first type of charging instructions for the transaction to the payment provider instruct the payment provider to charge an account the charge amount for the transaction.

9. The computer program product of claim 1, wherein the second type of charging instructions for the transaction to the payment provider instruct the payment provider to charge an account a recurring charge amount for the transaction.

10. The computer program product of claim 1, wherein the third type of charging instructions for the transaction to the payment provider instruct the payment provider to charge an account a recurring charge amount for the transaction, such that a subscription is renewed.

11. A method, comprising:

receiving, utilizing a uniform billing application program interface, information associated with a transaction, the information associated with the transaction including an indication of a type of the transaction, an account number, an identifier of a user, and a charge amount for the transaction, the uniform billing application program interface capable of receiving the information from a plurality of different types of billing sources including a merchant, a payment provider, and a billing aggregator;

determining whether the transaction is of a first type, utilizing a processor and further utilizing the uniform billing application program interface;

determining whether the transaction is of a second type, utilizing a processor and further utilizing the uniform billing application program interface;

determining whether the transaction is of a third type, utilizing a processor and further utilizing the uniform billing application program interface;

managing billing of the transaction utilizing a processor and further utilizing the uniform billing application program interface which is accessible to the plurality of different types of billing sources, the managing including:

if it is determined that the transaction is of the first type, submitting, utilizing the uniform billing application program interface, a first type of charging instructions for the transaction to a payment provider, if it is determined that the transaction is of the second type, submitting, utilizing the uniform billing application program interface, a second type of charging instructions for the transaction to the payment provider, if it is determined that the transaction is of the third type, submitting, utilizing the uniform billing application program interface, a third type of charging instructions for the transaction to the payment provider, and receiving, utilizing the uniform billing application program interface, a transaction response;

returning a billing response to at least one of the billing sources from which the information associated with the transaction was received, based on the transaction response, the billing response including one of an indication that the transaction was successful, an indication that the transaction failed, and an indication that the transaction is pending;

receiving a flag set by a merchant wherein the merchant may set the flag to true or false, wherein a false setting indicates that the payment service provider is to generate and send an advice-of-charge; and determining whether the flag is set to false;

wherein if it is determined that the flag is set to false, the merchant is prevented from sending an advice-of-charge generated by the merchant, and if it is determined that the flag is set to true, the merchant is not prevented from sending an advice-of-charge generated by the merchant.

12. A system, comprising:

a processor for:

receiving, utilizing a uniform billing application program interface, information associated with a transaction, the information associated with the transaction including an indication of a type of the transaction, an account number, an identifier of a user, and a charge amount for the transaction, the uniform billing application program interface capable of receiving the information from a plurality of different types of billing sources including a merchant, a payment provider, and a billing aggregator, determining whether the transaction is of a first type, utilizing the uniform billing application program interface, determining whether the transaction is of a second type, utilizing the uniform billing application program interface, determining whether the transaction is of a third type, utilizing the uniform billing application program interface, managing billing of the transaction utilizing the uniform billing application program interface which is accessible to the plurality of different types of billing sources, the managing including:

if it is determined that the transaction is of the first type, submitting, utilizing the uniform billing application program interface, a first type of charging instructions for the transaction to a payment provider, if it is determined that the transaction is of the second type, submitting, utilizing the uniform billing application program interface, a second type of charging instructions for the transaction to the payment provider, if it is determined that the transaction is of the third type, submitting, utilizing the uniform billing application program interface, a third type of charging instructions for the transaction to the payment provider, and receiving, utilizing the uniform billing application program interface, a transaction response, returning a billing response to at least one of the billing sources from which the information associated with the transaction was received, based on the transaction response, the billing response including one of an indication that the transaction was successful, an indication that the transaction failed, and an indication that the transaction is pending;

receiving a flag set by a merchant wherein the merchant may set the flag to true or false, wherein a false setting indicates that the payment service provider is to generate and send an advice-of-charge; and determining whether the flag is set to false;

wherein if it is determined that the flag is set to false, the merchant is prevented from sending an advice-of-charge generated by the merchant, and if it is determined that the flag is set to true, the merchant is not prevented from sending an advice-of-charge generated by the merchant.

13. The system of claim 12, wherein the processor is coupled to memory via a bus.

\* \* \* \* \*